July 23, 1957  H. P. PHILLIPS ET AL  2,800,378
PISTON RING ASSEMBLY AND ELEMENT THEREOF
Filed Jan. 25, 1955  2 Sheets-Sheet 2
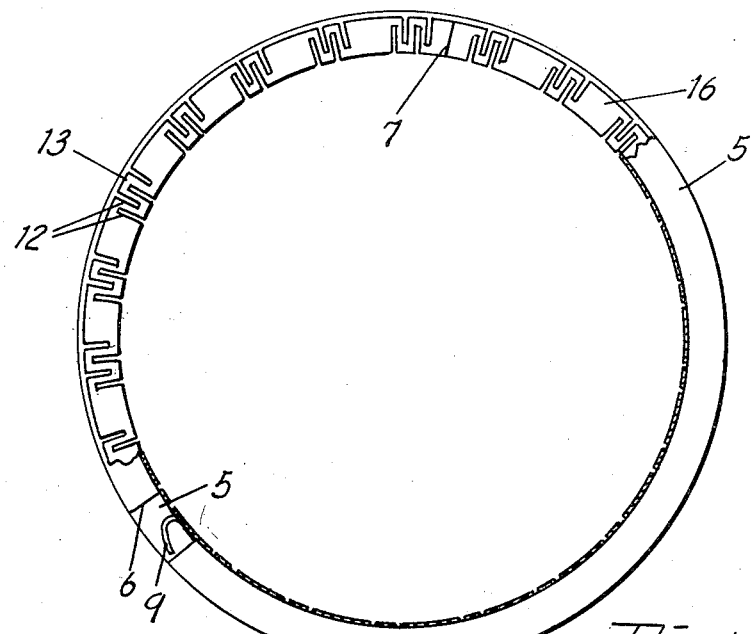
Fig. 4.
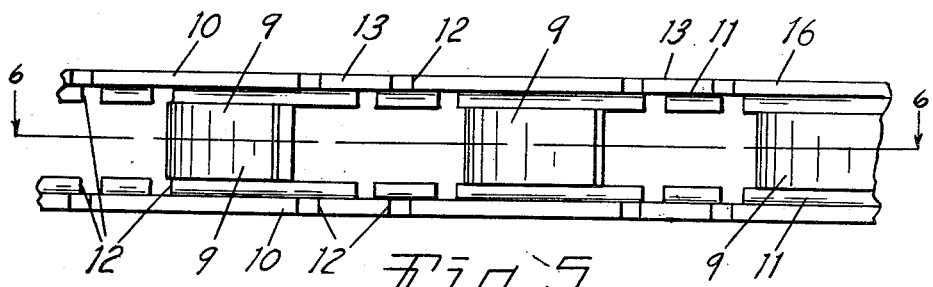
Fig. 5.
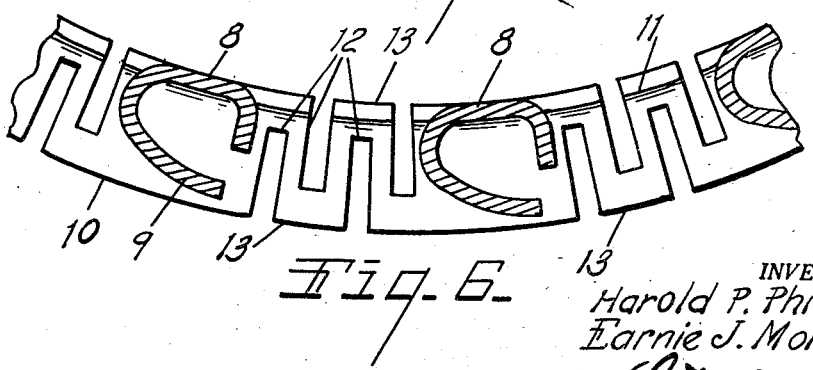
Fig. 6.
INVENTOR.
Harold P. Phillips
Earnie J. Morgan
BY 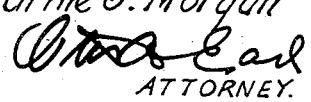
ATTORNEY.

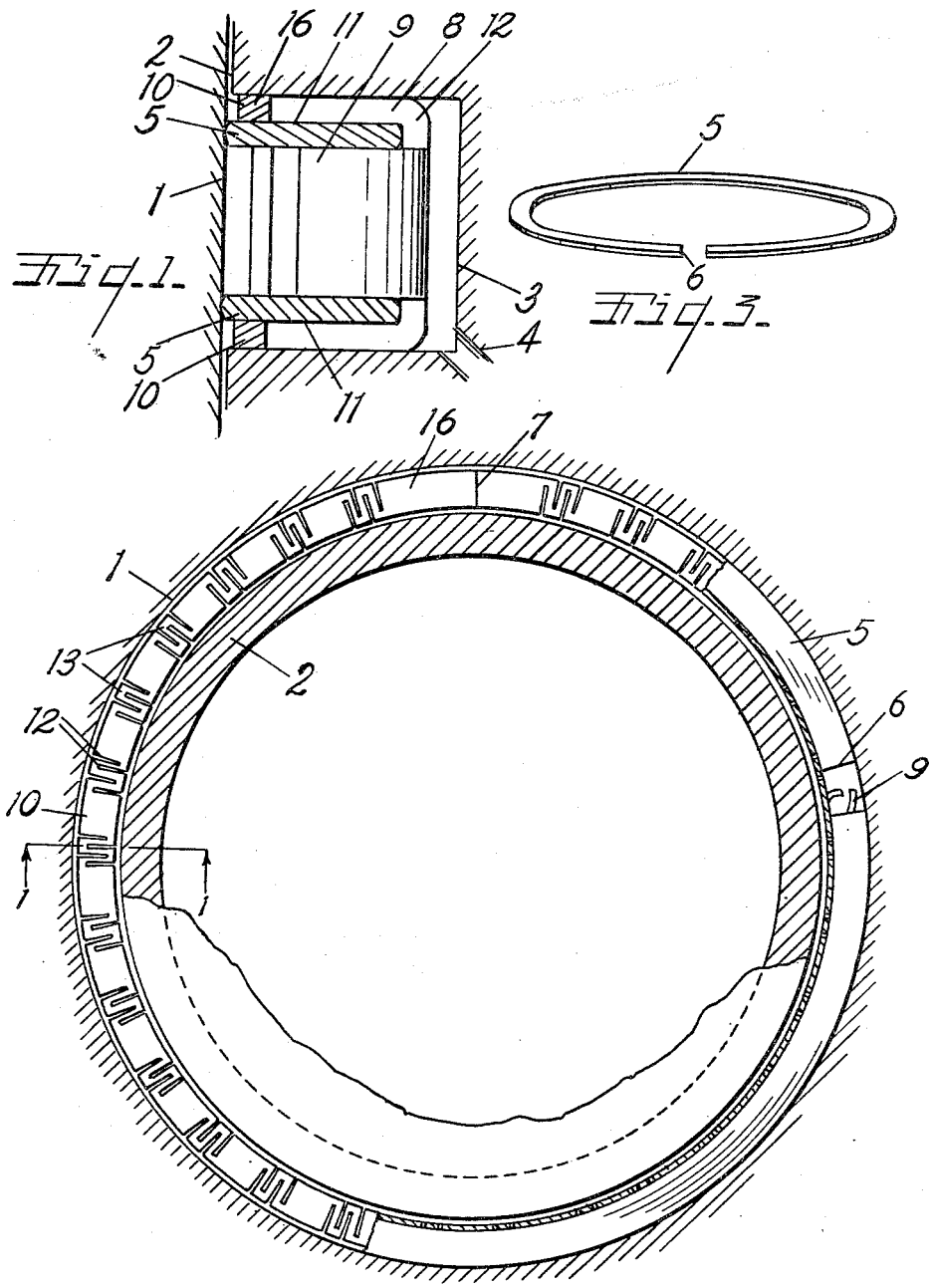

United States Patent Office 2,800,378
Patented July 23, 1957

2,800,378

PISTON RING ASSEMBLY AND ELEMENT THEREOF

Harold P. Phillips and Earnie J. Morgan, Hastings, Mich., assignors to Hastings Manufacturing Company, Hastings, Mich.

Application January 25, 1955, Serial No. 483,924

7 Claims. (Cl. 309—45)

This invention relates to a piston ring assembly and an element thereof.

The main objects of the invention are:

First, to provide a piston ring assembly comprising an axially spaced cylinder wall engaging element and a carrier and expander element which may be installed as an assembly or unit in a piston ring groove.

Second, to provide a piston ring assembly of this character in which the cylinder wall engaging elements are effectively supported and subjected to substantially uniform radial thrust throughout.

Third, to provide a piston ring assembly which is particularly well adapted for use in worn cylinders which may be out of round or tapered or both.

Fourth, to provide a combined carrier and spacer element which springably supports an associated cylinder wall engaging element without regard to the depth of the groove in which the assembly is installed.

Fifth, to provide a structure having these advantages which is relatively light in weight and at the same time strong and durable.

Objects relating to details and economies of the invention will appear from the description to follow. The invention is defined and pointed out in the claims.

A preferred embodiment of the invention is illustrated in the accompanying drawing, in which:

Fig. 1 is a vertical section on a line corresponding to line 1—1 of Fig. 2 of a cylinder and piston with the piston ring assembly installed therein, no attempt being made to show the parts in their relative proportions or allowable clearances and tolerances between parts.

Fig. 2 is a fragmentary cross sectional view through a piston and cylinder with parts being broken away to better show the relation of the parts.

Fig. 3 is a perspective view of one of the cylinder wall engaging elements.

Fig. 4 is a fragmentary view, partially in side elevation of the ring assembly.

Fig. 5 is an enlarged fragmentary plan view of the connector expander element.

Fig. 6 is a fragmentary sectional view thereof on a line corresponding to line 6—6 of Fig. 5.

The embodiment of the invention illustrated is designed as an oil ring. In the accompanying drawings 1 represents a cylinder, and 2 a piston having a piston ring groove 3 therein, the groove being provided with drain openings 4. The radially expansible cylinder wall engaging rails or elements 5 are desirably split at 6. The elements 5 are desirably formed of ribbon steel coiled edgewise and are axially spaced and urged against the cylinder wall under radial thrust of the combined carrier and expander designated by the numeral 16.

The annular split carrier and expander is desirably formed of ribbon steel and is of outwardly facing section and split at 7. The web 8 of the carrier and expander 16 has intermediate portions thereof struck outwardly between the flanges forming spaced spacer members 9. The end edges of the spacer members 9 are spaced from the flanges 10 of the carrier and expander member providing grooves 11 to receive the cylinder wall engaging elements 5, as is illustrated at Fig. 1. The remaining web portions constitute thrust abutments for the cylinder wall engaging elements, as is clearly shown in Fig. 1. This feature of striking out of parts of the web to constitute spacers and to cooperate with the flanges in forming grooves for cylinder wall engaging elements is substantially that shown in the patent to Phillips 2,594,987, issued April 29, 1952.

In the present invention, the portions of the flanges of the carrier and expander between the connecting web portions have radial slots 12 therein, and alternating slots opening at the inner and outer edges of the flanges, thus providing annular series of groups of circumferentially springable elements 13. As these groups are uniformly distributed through the circumference of the carrier and expander, the spring tension thereof is very uniform when the assembly is installed in a piston with the ends of the carrier and expander in abutting relation. This results in a very uniform radial thrust on the cylinder wall engaging elements coactingly supporting them under a substantially uniform radial thrust against the wall of the cylinder even when it is substantially out of round and has a substantial taper as the result of wear. The entire assembly may move transversely of the axis of the pistons.

In practice, the carrier and expander member is desirably formed of ribbon steel and tempered after the shaping and forming operation. The cylinder wall contacting elements are also desirably formed of ribbon steel of the order of .024 inch, but it will be understood that there may be very substantial variations in thickness.

The combined carrier and expander is adapted for use with other cylinder wall engaging elements such, for example, as cast iron. However, one of the advantages of the particular structure illustrated is that the parts may be factory assembled as a complete unit and installed as a complete unit and owing to their being fabricated of ribbon steel they are not injured by such unitary installation and this results in a very great saving of time as compared to ring assemblies in which the expander, ring elements, and the spacer must be separately inserted and assembled in the groove. The assembly is also light in weight.

We have illustrated and described our invention in a very highly practical embodiment thereof. We have not attempted to illustrate other embodiments or adaptations as it is believed that this disclosure will enable those skilled in the art to embody or adapt our invention as may be desired.

Having thus described the invention, what is claimed as new and is desired to be secured by Letters Patent is:

1. A piston ring assembly comprising a split carrier and expander element of outwardly facing channel section formed of ribbon steel and having angularly spaced intermediate portions of the web thereof disposed outwardly between the flanges with their ends in spaced relation to the flanges and coacting therewith to provide axially spaced ring element grooves, the portions of the web between the ends of said spacer elements and the flanges and between said spacer elements constituting the bottoms of the grooves, the portions of the flanges of the carrier and expander element between each of said spacer elements having a plurality of uniformly spaced radial slots opening alternately to the inner and outer edges of the flanges, the slots opening at the inner edges of the flanges extending through the said groove bottom portion between said spacer elements, said slots in said flanges providing an annular series of circumferentially springable elements, and thin split annular radial expansible cylinder wall engaging elements disposed in said ring element receiving grooves of said carrier and expander element and supported in axially spaced relation by said spacer elements, said carrier and expander element acting to springably support the cylinder wall elements when the assembly is installed in a piston ring groove with the ends of the expander element in abutting relation and under compression stress.

2. A piston ring assembly comprising a split carrier and expander element of outwardly facing channel section formed of ribbon steel and having angularly spaced intermediate portions of the web thereof disposed outwardly between the flanges with their ends in spaced relation to the flanges and coacting therewith to provide axially spaced ring element grooves, the portions of the web between the ends of said spacer elements and the flanges constituting the bottoms of the grooves, the portions of the flanges of the carrier and expander element between each of said spacer elements having a plurality of uniformly spaced radial slots opening alternately to the inner and outer edges of the flanges, said slots in said flanges providing an annular series of circumferentially springable elements, and thin split annular radial expansible cylinder wall engaging elements disposed in said ring element receiving grooves of said carrier and expander element and supported in axially spaced relation by said spacer elements, said carrier and expander element acting to springably support the cylinder wall elements when the assembly is installed in a piston ring groove with the ends of the expander element in abutting relation and under compression stress.

3. A piston ring assembly comprising an annular split carrier and expander element of outwardly facing channel section formed of ribbon steel and having a plurality of angularly and uniformly spaced openings in the web thereof, the portions of the flanges of the carrier and expander element at the sides of the said openings in the web having a plurality of radial slots therein opening alternately to the inner and outer edges of the flanges providing an annular series of circumferentially spaced springable elements, the series of slots in the flanges being axially aligned, and a split annular radially expansible cylinder wall engaging element arranged within said carrier and expander element in radially thrust supported relation thereto, said carrier and expander element acting to radially springably support the cylinder wall engaging element when the assembly is installed in a piston ring groove with the ends of the carrier and expander element in abutting relation and the assembly subjected to compression stresses.

4. A piston ring assembly comprising a split carrier and expander element of outwardly facing channel section formed of ribbon steel, angularly spaced portions of flanges of the said carrier and expander element having slots therein opening alternately at the inner and outer edges of the flanges and providing a series of angularly spaced groups of circumferentially springable elements, and a split annular radially expansible cylinder wall engaging element arranged within said carrier and expander element in radial thrust supported relation thereto, said carrier and expander element acting to radially springably support the cylinder wall engaging element when the assembly is installed in a piston ring groove with the ends of the carrier and expander element in abutting relation and the assembly subjected to compression stress.

5. An annular split ring carrier and expander element of outwardly facing channel section having angularly spaced intermediate portions of the web thereof disposed outwardly between the flanges with their ends in spaced relation to the flanges and coacting therewith to provide axially spaced ring element grooves, the portions of the web between the ends of said spacer elements and the flanges constituting the bottoms of the grooves, the portions of the flanges of the carrier element between each of said spacer elements having a plurality of uniformly spaced radial slots opening alternately to the inner and outer edges of the flanges, the slots opening at the inner edges of the flanges extending through the said groove bottom portion between said spacer elements, said slots in said flanges providing an annular series of circumferentially springable elements, said carrier and expander element acting to springably support a cylinder wall element arranged in the groove thereof when the assembly is installed in a piston ring groove with the ends of the expander element in abutting relation and under compression stress.

6. An annular split ring carrier and expander element of outwardly facing channel section having angularly spaced intermediate portions of the web thereof disposed outwardly between the flanges with their ends in spaced relation to the flanges and coacting therewith to provide axially spaced ring element grooves, the portions of the web between the ends of said spacer elements and the flanges constituting the bottoms of the grooves, the portions of the flanges of the carrier element between each of said spacer elements having a plurality of uniformly spaced radial slots opening alternately to the inner and outer edges of the flanges, said slots in said flanges providing an annular series of circumferentially springable elements, the slots of the series being axially aligned, said carrier and expander element acting to springably support a cylinder wall element arranged in the groove thereof when the assembly is installed in a piston ring groove with the ends of the expander element in abutting relation and under compression stress.

7. An annular split piston ring carrier and expander element of outwardly facing channel section formed of ribbon steel and having a plurality of angularly and uniformly spaced openings in the web portion thereof, the portions of the flanges of the carrier and expander element at the sides of the said openings in the web having a plurality of radial slots therein opening alternately to the inner and outer edges of the flanges providing an annular series of circumferentially spaced sprinbable elements, the series of slots in the flanges being axially aligned, said carrier and expander element acting to radially springably support a cylinder wall engaging element disposed therein when the assembly is installed in a piston ring groove with the ends of the carrier and expander element in abutting relation and the assembly subjected radial to compression stresses.

References Cited in the file of this patent

UNITED STATES PATENTS

| | | |
|---|---|---|
| 2,262,311 | Zahodiakin | Nov. 11, 1941 |
| 2,594,987 | Phillips | Apr. 29, 1952 |
| 2,685,485 | Olsen | Aug. 3, 1954 |
| 2,694,608 | Hamm | Nov. 16, 1954 |